US006452629B1

(12) United States Patent
Aizawa et al.

(10) Patent No.: US 6,452,629 B1
(45) Date of Patent: *Sep. 17, 2002

(54) SYSTEM FOR INSTALLING IMAGE SENSING PROGRAM (75) Inventors: Takashi Aizawa; Taku Yamagami; Akira Mamiya, all of Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/612,392

(22) Filed: Mar. 7, 1996

(30) Foreign Application Priority Data

| Mar. 15, 1995 | (JP) | 7-056049 |
| Mar. 24, 1995 | (JP) | 7-065703 |

(51) Int. Cl.$^7$ ............................ H04N 5/76; H04N 11/00
(52) U.S. Cl. ...................... 348/231; 348/552
(58) Field of Search ................................ 348/231, 233, 348/552; 395/183.12, 183.13, 183.14, 500, 651, 652, 653; 386/94; 360/60; 717/11

(56) References Cited

U.S. PATENT DOCUMENTS

| 4,853,733 A | * | 8/1989 | Watanabe et al. ............ 348/231 |
| 5,477,264 A | * | 12/1995 | Sarbadhikari et al. ....... 348/231 |
| 5,541,656 A | * | 7/1996 | Kare et al. .................. 348/334 |
| 5,563,655 A | * | 10/1996 | Lathrop ....................... 348/231 |
| 5,610,723 A | * | 3/1997 | Yamagishi .................... 386/75 |
| 5,615,061 A | * | 3/1997 | Singh .......................... 360/60 |
| 5,635,983 A | * | 6/1997 | Ohmori ....................... 348/233 |
| 5,802,342 A | * | 9/1998 | Yonooka et al. ............ 395/442 |
| 5,844,796 A | * | 12/1998 | Araki .......................... 717/11 |
| 5,892,683 A | * | 4/1999 | Sung ........................... 717/11 |
| 5,978,590 A | * | 11/1999 | Imai et al. ................... 717/11 |

OTHER PUBLICATIONS

User Guide, Microsoft Money; pp. 4–5; copyright 1991–1994.*

* cited by examiner

Primary Examiner—Wendy R. Garber
Assistant Examiner—Rashawn N. Tillery
(74) Attorney, Agent, or Firm—Morgan & Finnegan, L.L.P.

(57) ABSTRACT

An external program supplied from an external unit in order to process an image sensed by a camera is prevented from causing a malfunction in the camera. An external program supplied by an personal computer is stored in an EEPROM of the camera. The external program contains version information giving the version of the camera that is capable of using the external program, the name of the program for control, and parameter information corresponding to the program name. A CPU compares each of these items of information with corresponding information that has been set in the camera, thereby determining whether the external program is capable of being used. If the external program cannot be used by the camera, a warning display is presented on a display unit.

81 Claims, 8 Drawing Sheets

Camera version requirement : Ver 1

TSR requirement : SERIAL PHOTOGRAPHY exe support : NUMBER OF FRAMES

NUMBER OF FRAMES : 3

SHUTTER SPEED : 1/250

SYSTEM FOR INSTALLING IMAGE SENSING PROGRAM

BACKGROUND OF THE INVENTION

1. Field of the Invention

This invention relates to an image sensing device, a program for installing an image sensing program and a related system.

2. Description of the Related Art

Figure 8:
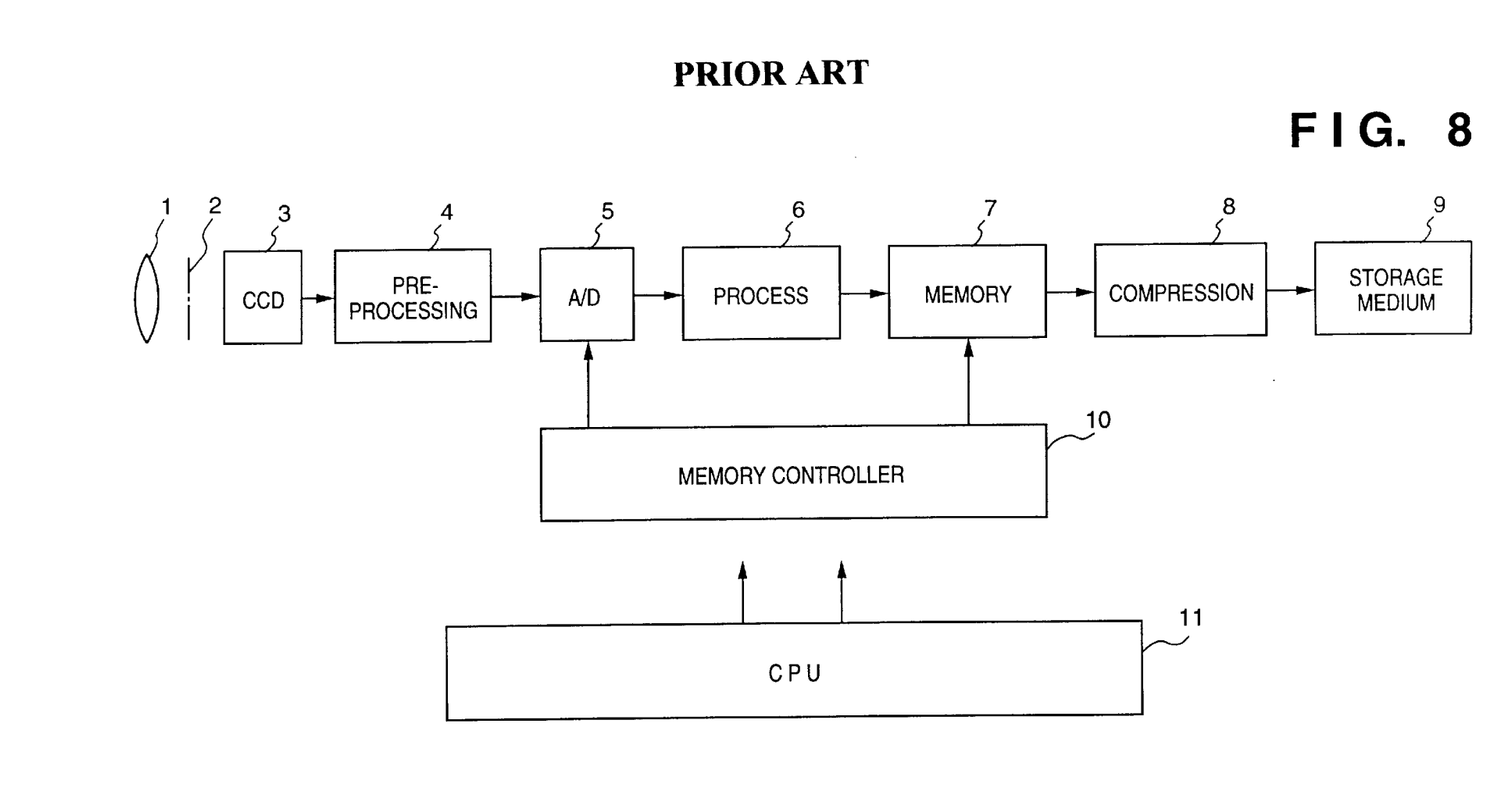
FIG. 8 is a block diagram showing the basic construction of a camera.

FIG. 8 is a block diagram illustrating the construction of an electronic camera according to the prior art.

As shown in FIG. 8, the optical image of a subject that has entered via a lens 1 and diaphragm/shutter 2 is converted to an electrical image signal by an image sensing element 3 such as a CCD. This image signal is subjected to pre-processing such as CDS (correlated double sampling) and AGC (automatic gain control) by a pre-processing circuit 4, the processed signal is converted to a digital signal by an A/D converter 5 and the digital image signal is then processed by a process circuit 6 to obtain image data having a prescribed format. These image data are temporarily stored in a memory 7, after which they are subjected to compressing coding by a compression circuit 8 and recorded on a recording medium 9. A memory controller 10 controls the A/D converter 5 and compression circuit 8, and a CPU 11 serves as system controller to control the overall system.

In the electronic camera described above, the program executed by the CPU 11 serving as the system controller is permanently provided in a ROM in the form of firmware, and the manner in which an image is to be recorded is decided beforehand when the apparatus is produced at the factory. This means that the diverse needs of users cannot be satisfied. Accordingly, the applicant has previous proposed a technique through which external programs are supplied to a camera from an external host computer, the programs are recorded on the recording medium 9, the camera is provided with a mechanism that is capable of executing an external program at the time of photography and image information recorded by the external program is capable of being expanded.

It has been contemplated to use a bar code, for example, as the external program, read the bar code immediately after photography and record the read information on the recording medium 9 as information attached to the photographed image. It has also been contemplated to record the photographed image after subjecting it to certain processing. For example, it is possible to supply an external program which converts the photographed image to a line-art image, an edge detection image, etc. Since these converted images generally contain much less data than the original image obtained by photography, data compression efficiency can be facilitated and a large number of images can be recorded by the recording medium 9.

The proposed techniques described above extend photography by applying some processing to the original image obtained by photography. However, since this function is not necessarily desired by all users, it is provided as an external program.

In a case where a camera is provided with external programs in the prior art described above, the camera itself and the external device for providing the camera with the external programs are not capable of ascertaining whether the external programs can be run by the version of the camera or by a control program with which the ROM is furnished in advance. In some cases there is the danger of operation hang-up, meaning that the camera cannot be used normally unless it is reset. Malfunctions can occur as well.

Further, when a camera is provided with external programs in the aforesaid prior art, the external programs are transferred from the external device, such as a computer, to a non-volatile memory within the camera or to a recording medium that is capable of being extracted. One external program is selected by operating the camera, thereby selecting the photographic mode. Alternatively, the photographic mode is selected by selecting an external program, which is capable of producing a desired image, by referring to an image file created by photography in the past.

These photographic modes are significant in that they serve as instruments for extending the functionality of the camera. It can be predicted that after the camera is made available for sale, external programs capable of implementing several effective photographic modes will be provided by the camera maker or by other vendors.

In such case, it is possible that an external program for one photographic mode will be installed and used in a number of cameras possessed by a number of users. If, when an external program on an extractable recording medium is recorded, the recording medium is used in cameras or in computers, it is possible that the external program will be transplanted to many recording media or memories. In a case where an external program for obtaining a desired image is established in another camera by referring to an image file created by photography in the past, it is conceivable that the external program used in the earlier photography will be transplanted to the other camera. This is a problem because it may lead to infringement on the copyright of the external program.

In view of these problems, therefore, an object of the present invention is to prevent an external program from being installed in a camera for which the program is not suited.

Another object of the invention is to prevent use of an external program not suited to a camera.

A further object of the invention is to prevent the unlawful installation of an external program.

Yet another object of the invention is to inhibit use of an external program that has been installed unlawfully.

SUMMARY OF THE INVENTION

An image sensing device according to the present invention is capable of installing an external program, which controls processing relating to sensing of the image of a subject, from an external device, the image sensing device comprising attribute acquisition means for acquiring an attribute of the external program, discriminating means for determining, based upon the attribute, whether the external program is capable of being used, and inhibiting means for inhibiting installation of the external program in a case where the external program is incapable of being used.

An image sensing device according to a second aspect of the invention is capable of installing an external program, which controls processing relating to sensing of the image of a subject, from an external device, the image sensing device comprising attribute acquisition means for acquiring an attribute of the external program, discriminating means for determining, based upon the attribute, whether the external program is capable of being used, and inhibiting means for inhibiting use of the external program in a case where the external program is incapable of being used.

An installation apparatus according to the present invention is for installing an external program, which controls processing relating to sensing of the image of a subject, in an image sensing device, the apparatus comprising device-information acquisition means for acquiring device information relating to a function of the image sensing device, discriminating means for determining, based upon the device information, whether the external program is capable of being used by the image sensing device, and inhibiting means for inhibiting installation of the external program in the image sensing device in a case where the external program is incapable of being used by the image sensing device.

An installation system according to the present invention is for installing an external program, which controls processing relating to sensing of the image of a subject, in an image sensing device from an external device, the system comprising attribute acquisition means for acquiring an attribute of the external program, discriminating means for determining, based upon the attribute, whether the external program is capable of being used by the image sensing device, enabling means for enabling installation of the external program in a case where the external program is capable of being used by the image sensing device, and installation means for installing the external program in the image sensing device from the external device in a case where installation has been enabled by the enabling means.

An image sensing device according to a third aspect of the invention is capable of installing an external program, which controls processing relating to sensing of the image of a subject, from an external device, the image sensing device comprising holding means for holding self-identification information, acquisition means for acquiring identification information that has been attached to the external program, discriminating means for determining whether the self-identification information agrees with the identification information that has been attached to the external program, and inhibiting means for inhibiting installation of the external program in a case where the self-identification information and the identification information that has been attached to the external program fail to agree.

An image sensing device according to a fourth aspect of the invention is capable of installing an external program that controls processing relating to sensing of the image of a subject, the image sensing device comprising storage means for storing the external program, acquisition means for acquiring identification information that has been attached to the external program stored in the storage means, holding means for holding self-identification information, discriminating means for determining whether the self-identification information agrees with the identification information that has been attached to the external program, and inhibiting means for inhibiting execution of the external program stored in the storage means in a case where the self-identification information and the identification information that has been attached to the external program fail to agree.

An installation apparatus according to a second aspect of the present invention is for installing an external program, which controls processing relating to sensing of the image of a subject, in an image sensing device, the apparatus comprising acquisition means for acquiring identification information of the image sensing device, discriminating means for determining whether identification information that has been attached to the external program agrees with the identification information of the image sensing device, and inhibiting means for inhibiting installation of the external program in the image sensing device in a case where the identification information that has been attached to the external program and the identification information of the image sensing device fail to agree.

An installation system according to a second aspect the present invention is for installing an external program, which controls processing relating to sensing of the image of a subject, in an image sensing device from an external device, the system comprising acquisition means for acquiring identification information of the image sensing device, discriminating means for determining whether identification information that has been attached to the external program agrees with the identification information of the image sensing device, and inhibiting means for inhibiting installation of the external program in the image sensing device in a case where the identification information that has been attached to the external program and the identification information of the image sensing device fail to agree.

Further objects, features and advantages of the present invention will become apparent from the following detailed description of embodiments of the present invention with reference to the accompanying drawings.

DESCRIPTION OF THE PREFERRED EMBODIMENTS

[First Embodiment]

Figure 1:
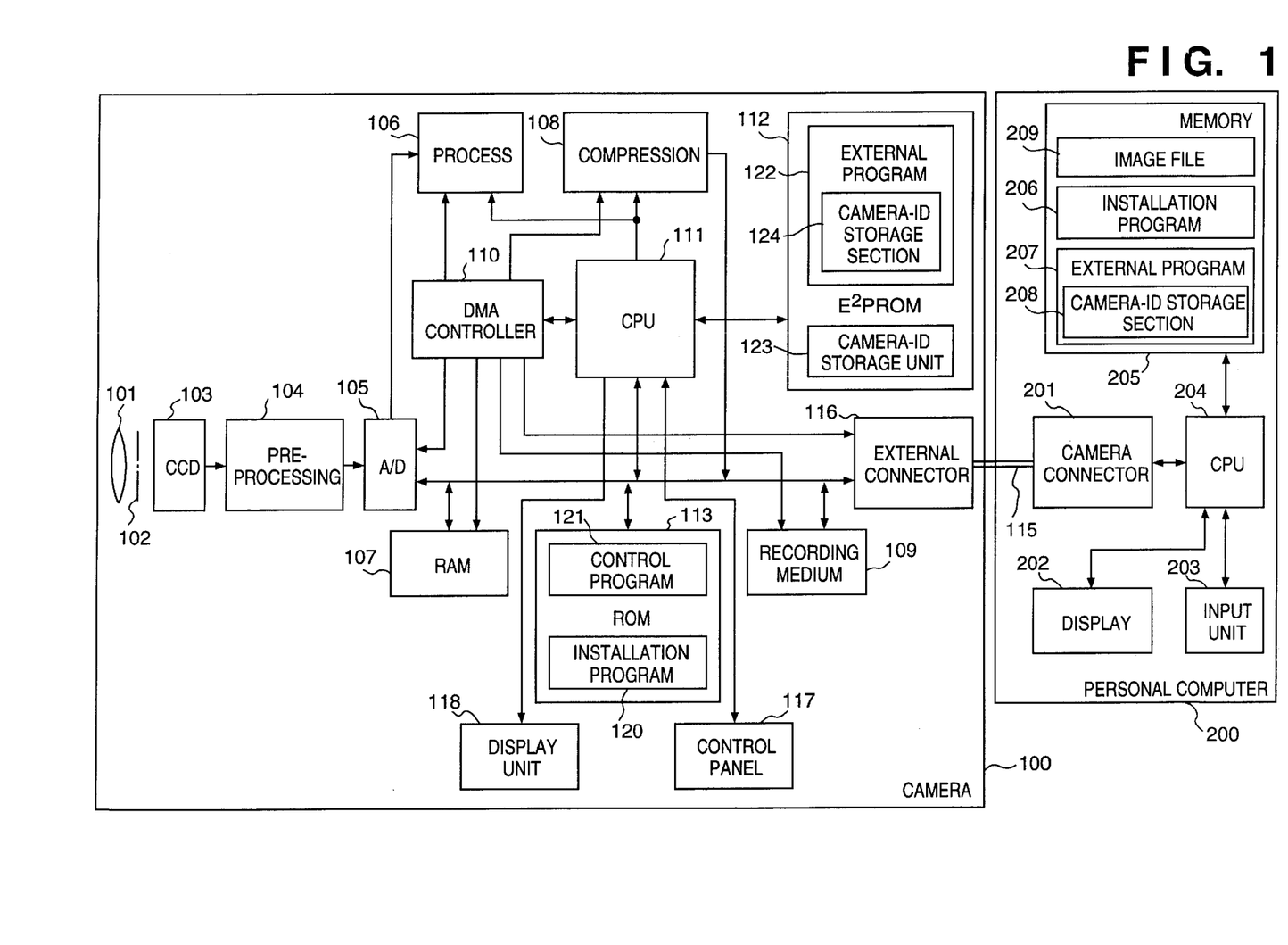
FIG. 1 is a block diagram illustrating an example of the construction of a camera system according to the present invention.

FIG. 1 is a block diagram illustrating the construction of a camera system according to the present invention. The optical image of a subject that has entered a camera 100 via a lens 101 and diaphragm/shutter 102 is converted to an electrical image signal by an image sensing element 103 such as a CCD (charge-coupled device). This image signal is subjected to pre-processing such as CDS (correlated double sampling) and AGC (automatic gain control) by a pre-processing circuit 104, the processed signal is converted to a digital signal by an A/D converter 105 and the digital image signal obtained from the conversion is then transformed by a process circuit 106 to image data having a prescribed format. The image data are stored temporarily in a RAM 107.

A compression circuit 108 compresses the image data that have been stored in the RAM 107 and then stores the compressed image data on a recording medium 109. A DMA controller 110 controls transfer of data among various devices, wherein transfer is by DMA (direct memory access). A CPU 111 executes overall control of the camera 100 based upon a control program and the like stored in a ROM 113. An EEPROM 112 stores external programs supplied by a personal computer (PC) 200 connected to an external connector 116 and delivers the external programs to the CPU 111. The user is capable of operating the camera 100 by a control panel 117, and the operating status of the camera 100 is displayed on a display unit 118.

The personal computer 200 is connected to the camera 100 by a camera connector 201 via a communication cable 115 and has a memory 205 which stores an installation program 206 and an external program 207. A CPU 204 reads in the installation program 206 and, on the basis of the program 206, controls processing for installing the external program 207 in the camera 100. While observing a display 202 on a monitor of the personal computer 200, the user is capable of entering desired instructions using an input unit 203 such as a keyboard and a mouse.

Figure 2:
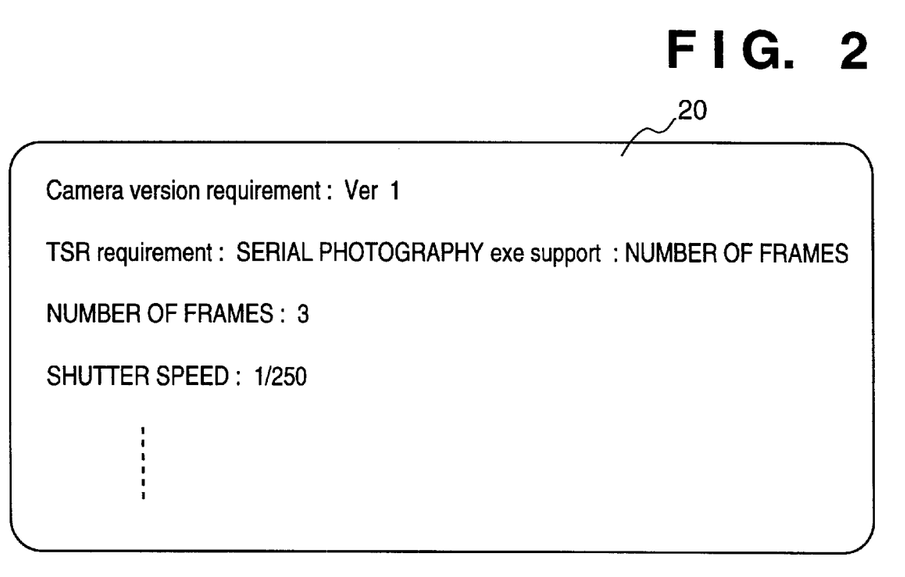
FIG. 2 is a diagram showing an example of a tag on which information relating to a configuration stored in an external program has been recorded.

The external program 207 includes version information indicative of cameras capable of using the external program, the program name which this program uses, as well as parameters. FIG. 2 illustrates an example in which configuration-related information 20 such as the version is described in the format of a TAG.

Figure 3:
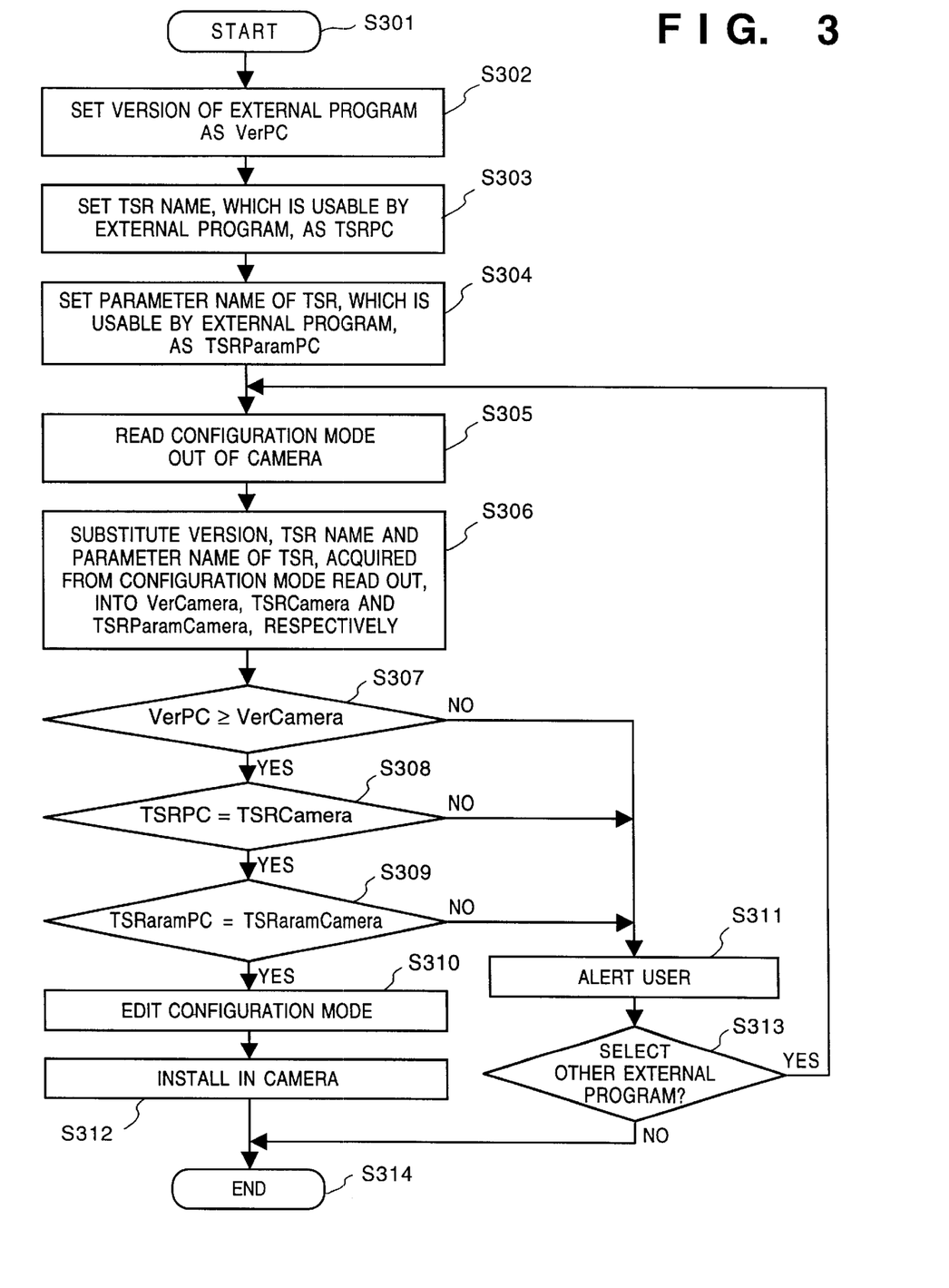
FIG. 3 is a flowchart showing the flow of processing based upon an installation program 206.

The flow of processing based upon the installation program 206 in the personal computer (PC) 200 will now be described with reference to the flowchart of FIG. 3.

The installation program 206 is started up at step S301 so the computer makes a transition to a configuration editing mode. Next, the version of the external program 207 is set as the variable VerPC at step 302. This is followed by step S303, at which a TSR (terminate but stay) name capable of being used by the external program 207 is set as a variable TSRPC.

Next, at step S304, the parameter name of the TSR capable of being used by the external program 207 is set as a variable TSRParamPC. The information 20 relating to configuration mode is read out of the camera 100 via the communication cable 115 and camera connector 201 at step S305. A parallel port, a serial port, an SCSI, etc., can be used for communication.

Next, at step S306, the version, TSR name and TSR parameter name are acquired from the read information 20 relating to the configuration mode, and the version is substituted for the variable VerCamera, the TSR name for TSRCamera, and the parameter name of the TSR for TSR-ParamCamera.

Step S307 calls for VerPC and VerCamera to be compared. Processing proceeds to step S308 if VerPC≧VerCamera holds and to step S311 if VerPC<VerCamera holds. Though the version usually can be updated to a higher version, there are also cases where operation is possible only with the same version. In such cases processing would proceed to step S308 only when VerPC=VerCamera holds.

This is followed by step S308, at which TSRPC and TSRCamera are compared. Processing proceeds to step S309 if the two are equal and to step S311 if the two are not equal. TSRParam and TSRParamCamera are compared at step S309. Processing proceeds to step S309 if the two are equal and to step S311 if the two are not equal. The configuration mode is edited at step S310 in conformity with the external program 207 to be installed.

Step S311 calls for the user to be warned of the fact that the configuration mode is incapable of being altered. This warning can be issued using the display 202 or display unit 118. In a case where the warning is issued using the display unit 118, for example, the indication of the warning can take on various forms depending upon the form of the display unit 118.

The external program 207 is installed in the camera 100 at step S312. Whether another external program 207 is selected is decided at step S313 based upon a command from the user. If the answer is "YES", processing returns to step S305. If the answer is "NO", the program proceeds to step S314, where processing is terminated.

Figure 4:
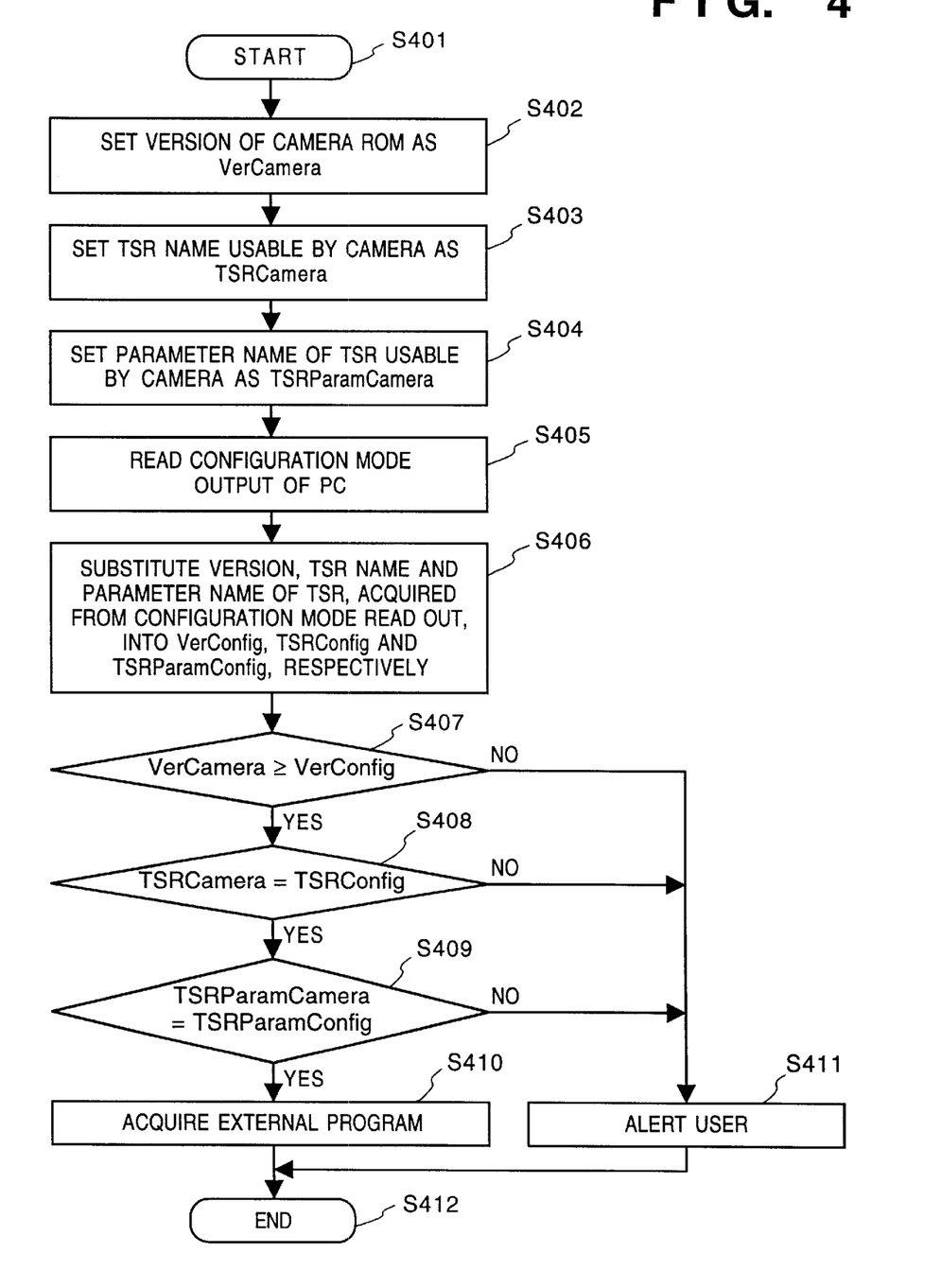
FIG. 4 is a flowchart showing the flow of processing based upon an installation program 120.

The flow of processing based upon the installation program 120 in the camera 100 will now be described with reference to FIG. 4. It should be noted that the installation programs 120, 206 are run independently of each other so that installation can be performed by either program.

The installation program 120 is started up at step S401. Start-up is achieved by having the operator press a mode button 117a shown in FIG. 5, whereby the installation mode is selected.

Next, the version of the ROM 13 (control program 121) is set as the variable VerCamera at step 402. This is followed by step S403, at which a TSR name capable of being used by the variable TSRCamera 100 is set. Next, at step S404, the parameter name of the TSR capable of being used by camera 100 is set as a variable TSRParamCamera.

The information 20 relating to the configuration mode is read out of the personal computer 200 via the communication cable 115 and external connector 116 at step S405. Next, at step S406, the version, TSR name and TSR parameter name are acquired from the read information 20 relating to the configuration mode, and the version is substituted for the variable VerConfig, the TSR name for TSRConfig, and the parameter name for TSRParamConfig.

Step S407 calls for VerCamera and VerConfig to be compared. Processing proceeds to step S408 if VerCamera≧VerConfig holds and to step S411 if VerCamera<VerConfig holds. In a case where the camera operates only when the version is identical, processing would proceed to step S408 only when VerCamera = VerConfig holds.

This is followed by step S408, at which TSRCamera and TSRConfig are compared. Processing proceeds to step S409 if the two are equal and to step S411 if the two are not equal. TSRParamCamera and TSRParamConfig are compared at step S409. Processing proceeds to step S409 if the two are equal and to step S411 if the two are not equal. In a case where the TSR name and parameter name are not present in the information 20 relating to the configuration mode, the above-mentioned comparison cannot be made. Accordingly, processing proceeds to step S411 and the user is warned.

The external program 207 is acquired from the personal computer 200 and stored in the EEPROM 112 at step S410. Step S411 calls for the user to be warned of the fact that use (installation) of the designated external program is impossible. This warning can be issued by causing an indicator on the display unit 118 to flash. Further, the warning may be issued by the display 202. For example, the user may respond to the warning by preparing another external program and pressing the mode button 117a again to select the installation mode and install the program.

In the embodiment described above, it is determined at the time of installation whether an external program to be installed is suited to the camera. Installation of an external program that is not suitable is prevented. However, the present invention can be applied in the following manner as well, by way of example: When an external program is used after it has been installed (e.g., in a case where a recording medium on which the external program has been stored is used as the recording medium 109), it is determined whether the external program is suited to the camera. If the external program is unsuitable, running of the program is stopped.

In order to realize this arrangement, the configuration would be acquired from the external program to be used instead of being read in from the personal computer 200 at step S405. Then, at steps S406~S409, it would be determined whether this external program is suited to the camera and use of the external program would be allowed at step S410 if the external program is found to be suitable.

Thus, in accordance with the present invention as described above, version information giving the version of a camera that is capable of using an external program, the environment in which the external program can be run, the necessary programs and information such as parameters are stored in the external program in advance. Then, at the time of installation or after installation has been performed, a comparison is made with the functions of the camera and installation or use of the external program is allowed based upon the results of the comparison. This makes it possible to eliminate start-up of an external program that cannot be run and to suppress hang-up or malfunction of the camera or of the external control system, such as a personal computer.

[Second Embodiment]

In this embodiment, the camera ID of a camera in which the external program 207 is to be installed is recorded in a camera-ID storage section 208, which is provided within the external program 207, before the external program 207 is installed in the camera 100. Then, when the external program 207 is installed in the camera 100 or after the external program 207 has been installed, the camera ID, which has been recorded in a camera-ID storage unit 123 of the camera 100 is compared with the camera ID that has been recorded in the camera-ID storage section 208, and installation or use of the external program 207 is allowed only if the two IDs agree.

As a result of this operation, it is possible to prevent the same external program 207 from being installed in a number of cameras without permission. In addition, if the EEPROM 112 or the like used by the camera 100 differs from the EEPROM of another camera, an external program that has already been installed in this EEPROM 112 can be prevented from being used without permission.

Further, in this embodiment, the external program may be supplied to the camera 100 together with a sample image (image file) indicating the effects of the external program. In this case it will suffice if the sample image is supplied in a standard image file format, e.g., a TIFF format. Since the standard image format has an area which stores comment text, information for specifying the corresponding external program may be stored in this area. An example of the specifying information which may be used is the name of the external program. For instance, in a case where use is made of an image file having a TIFF format, it will suffice to record the file name of the required external program and, if the external program requires a set option, the set option value. This is set in advance in the form of a private tag. As for the description of this information, an ASCII character string may be used as the file name and binary data or an ASCII character string may be used as the value of the option, by way of example. A method of constructing a private tag having a TIFF format is described in detail in TIFF Revision 6.0, Jun. 3, 1992, published by Aldus. The method is adopted in a part of this application.

Figure 6:
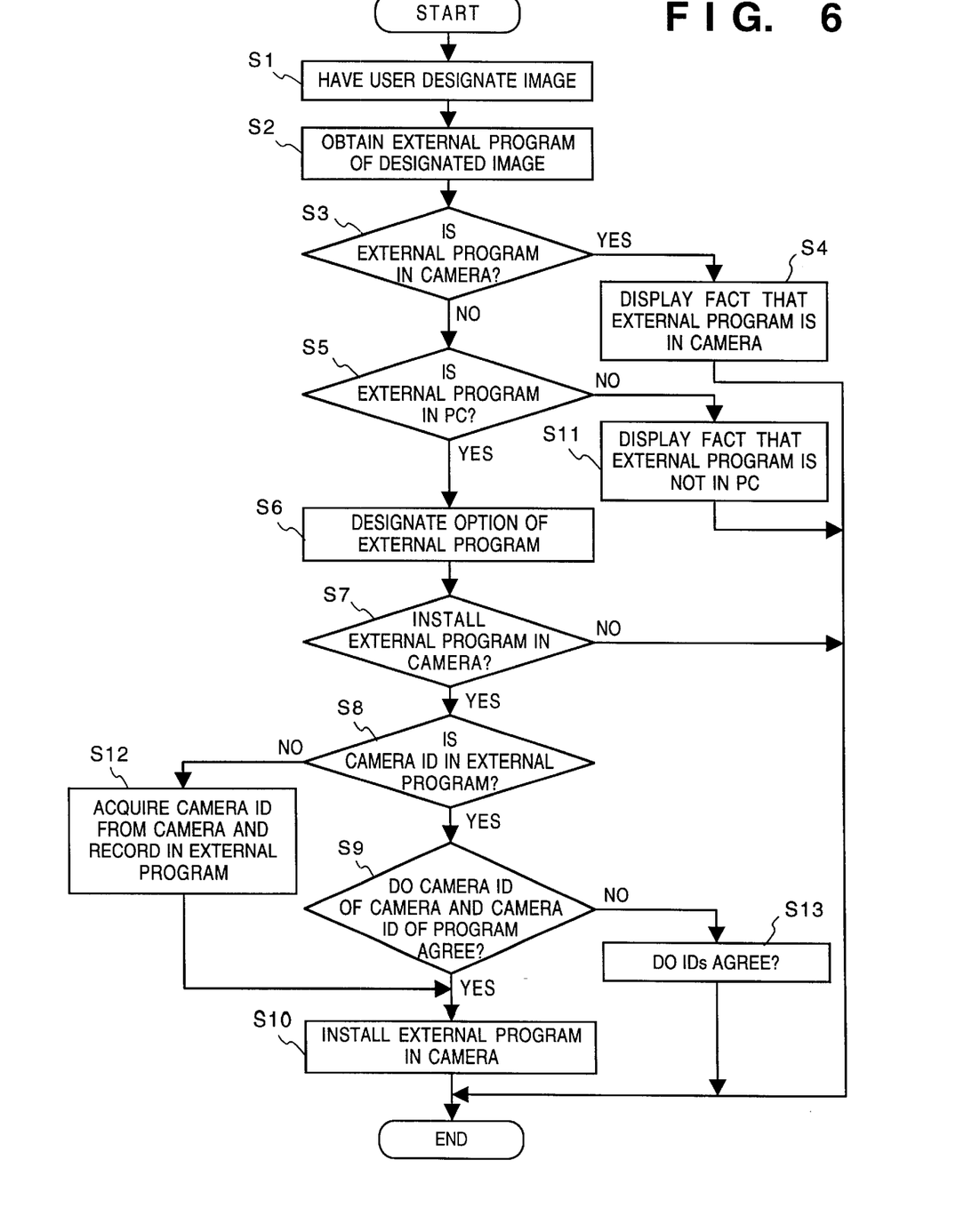
FIG. 6 is a flowchart showing processing based upon the installation program 206 or 120 in a second embodiment of the invention.

The flow of processing of this embodiment based upon the installation program 206 in the personal computer (PC) 200 will now be described with reference to the flowchart of FIG. 6. It should be noted that by providing the camera 100 with an installation program whose procedure is substantially the same as that of the installation program 206, the control described below may be performed by the installation program 120. However, the following description will be rendered solely with regard to the installation program 206 in order to avoid prolixity.

On the basis of one or a plurality of image files 209 in the memory 205, the installation program 206 displays sample images on the display 202 at step S1. It should be noted that the personal computer 200 is capable of acquiring image data present on the recording medium 109 of the camera 100 via the cable 115, subjecting an image actually accepted by the camera 100 to processing by the external program 207 and displaying the results for the user.

As mentioned above, information indicating which external program was used for processing has been stored in all image files 209. Naturally, images that have been recorded without using an external program also may exist. The above-mentioned private tag indicating information is not attached to such an image file. Alternatively, if the private tag is attached, the file name portion is left blank. In other words, it will suffice to adopt an expedient that indicates the fact that the external program is not being used. The user can select a specific external program by selecting a desired sample image from among a variety of sample images.

The file name of the external program 207 selected at step S1 is obtained at step S2. Whether the external program 207 is already present in the EEPROM 112 of the camera 100 is checked at step S3. Processing proceeds to step S4 if the external program 207 is present and to step S5 if the external program 207 is not present.

The fact that the selected external program 207 has been installed in the EEPROM 112 of the camera 100 is made known to the user at step S4 as by the display 202 and processing is them terminated.

It is determined at step S5 whether the substance of the selected external program 207 is present in the memory 205. The reason for this is that there the external program 207 corresponding to the image file 209 may not exist. Processing proceeds to step S6 if this external program does exist and to step S11 if it does not exist.

If the selected external program 207 requires the setting of an option, the user is allowed to edit this at step S6. In such case it is desired that an arrangement be adopted in which editing can be started using the value of the option belonging to the corresponding image file 209 as a default setting value.

Next, at step S7, the user verifies whether or not the selected external program 207 is to be installed in the camera 100. In case of installation, processing proceeds to step S8; otherwise, processing is terminated. It is determined at step S8 whether the camera ID has been recorded in the camera-ID storage section 208 of the selected external program 207. Processing proceeds to step S12 if the camera ID has not been recorded and to step S9 if the camera ID has been recorded.

At step S9, the camera ID is acquired from the camera 100 via the cable 115, and the camera ID already recorded in the camera-ID storage section 208 of the selected external program 207 is compared with the camera ID acquired from the camera 100. Processing proceeds to step S10 if the two IDs agree and to step S13 if the two IDs do not agree.

The selected external program 207 is installed in the camera 100 at step S10. If the recording medium 109 has enough capacity, the corresponding sample image (image file 209) may also be transferred to the camera together with external program so that the sample image can be confirmed on the camera 100.

At step S11, the user is alerted to the fact that the selected external program 207 has not been supplied to the camera 100 and a designation is made to establish a state in which the substance of the selected external program 207 can be acquired by the installation program 206. Processing is then terminated.

The camera ID is extracted from the camera 100 and is recorded in the ID-storage section 208 of the external program 207 at step S12. Processing then proceeds to step S10. The user is notified at step S13 of the fact that installation is impossible because the camera ID recorded in the selected external program 207 and the camera ID of the camera currently connected to the personal computer 200 differ. Processing is then terminated.

A list of the names of installed external programs and of the set options thereof is recorded in the EEPROM 112. Further, in a case where sample images (image files) 209 have been transferred along with the external programs, a list of the file names also is recorded. Text information that has been stored in installed external programs also may be recorded in the EEPROM 112. The user can select one external program from a plurality thereof by referring to these lists.

In a case where an external program having the same conditions (the same external program name or the same set options) has already been recorded in the EEPROM 112, registration anew is not required. Consequently, it will suffice to indicate to the user the fact that installation has already been performed at step S6, by way of example.

Next, a method of inhibiting use of an external program 122 in the camera 100 in a case where the external program 122 has been installed unlawfully (i.e., in a case where the external program 122 is not one that has been installed by the installation program 206) will be described with reference to FIG. 7. Unlawful installation can take on various forms. One example is a case where a recording medium on which the external program has been stored is used as the EEPROM 112.

Figure 7:
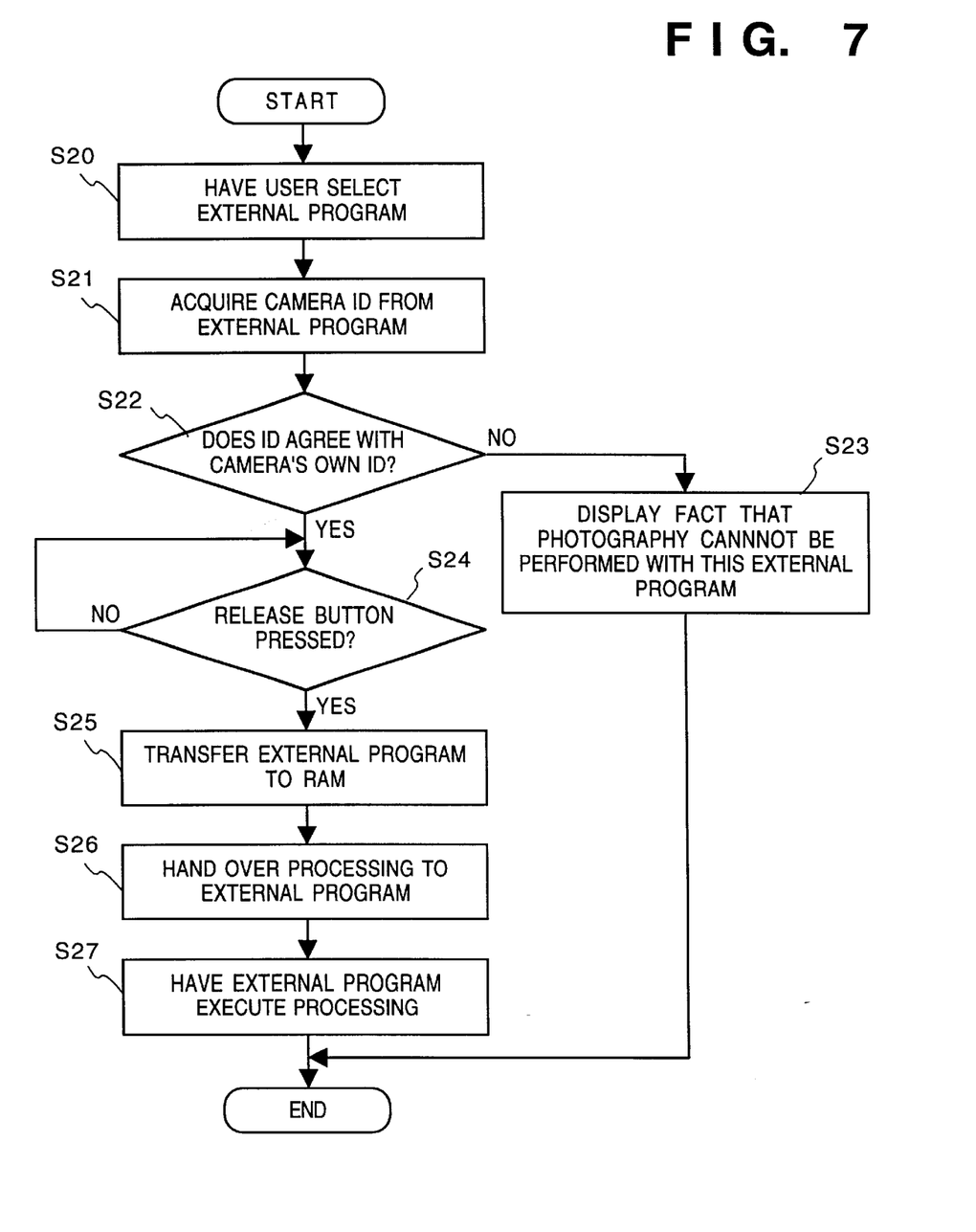
FIG. 7 is a flowchart showing processing based upon a control program 121 in the second embodiment.

FIG. 7 illustrates the flow of processing based upon the control program 121. At step S20, the user presses the motor button 117a on the camera 100 to select the mode which uses the external program 122. Whenever the user presses the mode button 117a, the camera 100 acquires the information of one or a plurality of external programs 122 recorded in the EEPROM 112 and displays the information on the display unit 118. Of course, an ordinary recording mode which does not make use of an external program also can be selected.

Figure 5:
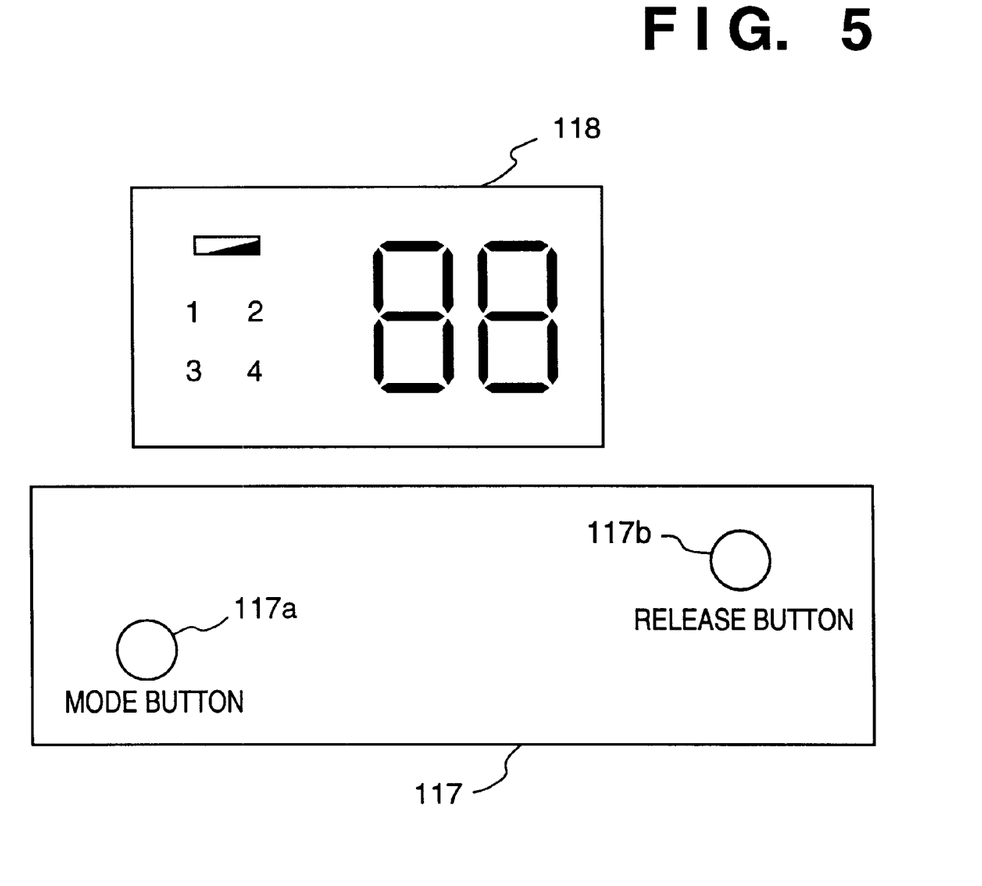
FIG. 5 is a diagram schematically illustrating an example of the construction of display unit 118 and control panel 117 of a camera 100.

This display of information differs depending upon the display capability of the camera 100. An example of a simple and inexpensive method is to light four numbers ("1", "2", "3", "4") in succession, as shown in FIG. 5, on the display unit 118. In this case, installable external programs are limited to four and it is necessary for the user to know the corresponding relationship between the numbers and the external programs.

In a case where the display unit 118 of the camera 100 is capable of displaying text, the selected external program can be indicated to the user by displaying text information (the name of the external program) that has been recorded in the EEPROM 112.

Further, in a case where the display unit 118 of the camera 100 is capable of displaying an image, an image file name that has been stored in the EEPROM 112 can be acquired and the corresponding image file can be read out of the recording medium 109 and displayed, thereby making it possible to confirm the specific function of the external program displayed.

With regard to the expression of an ordinary photography mode (a case in which an external program is not used), all four of the numbers may be extinguished, for example, if the camera is provided with the display unit 118 shown in FIG. 5. Further, if the display unit 118 of the camera is capable of displaying text or images, a character string indicative of the ordinary photography mode, e.g., "Normal", may be displayed.

A camera ID that has been stored in a camera-ID storage section 124 of the selected external program 122 is acquired at step S21. This is followed by step S22, at which the camera ID acquired from the selected external program is compared with the camera ID of the camera itself stored in the camera-ID storage unit 123. Processing proceeds to step S24 if the two IDs agree and to step S23 if they do not agree.

The fact that the selected external program (photographic mode) cannot be used with the camera is made known to the user at step S23 by displaying this fact on the display section 118. There are several ways this can be accomplished. For example, one method is to cause the selected external program to appear gray, and another method is to attach an inhibiting mark before or after the external program name.

The camera waits for the user to press a release button 117 at step S24 in order to verify the external program (photographic mode) used. In a case where an external program has been designated, the external program is read out of the EEPROM 112 and transferred to the RAM 107 at step S25.

This is followed by step S26, at which the entry address of the transferred external program is called as a subroutine, thereby shifting control to this external program. If a set option has been recorded in the ROM 112, the set value thereof is delivered as a parameter.

Processing is executed at step S27 in accordance with the external program that has been transferred to the RAM 107, and an image file is created. At this time the external program stores its own file name and the set option in the image file. The image processed by the external program is processed by the process circuit 106 and compression circuit 108, and the processed image is recorded on the recording medium 109.

Thus, in accordance with the present invention as described above, it is possible to prevent one external program from being installed unlawfully in a number of cameras.

Further, in a case where an external program has been installed in a camera unlawfully by an extractable recording medium, use of the program in the camera can be inhibited.

[Other Embodiments]

The present invention can be applied to a system constituted by a plurality of devices or to an apparatus comprising a single device.

Further, the object of the present invention can also be attained by providing a storage medium, which stores program codes for performing the aforesaid processes, in a system or apparatus, and reading out the program codes from the storage medium with the help of a computer (e.g., a CPU or MPU) of the system or apparatus so as to execute the program.

In this case, the program codes read out of the storage medium implement the functions according to the embodiments, and the storage medium storing the program codes constitutes the invention.

Further, the storage medium, such as a floppy disk, hard disk, optical disk, magneto-optical disk, CD-ROM, CD-R, magnetic tape, non-volatile memory card or ROM, can be used to provide the program codes.

Furthermore, besides the case where the aforesaid functions according to the embodiments are implemented by executing the program codes read by a computer, the present invention covers a case where an operating system (OS) or the like working on the computer performs a part of or the entire process in accordance with the designation of program codes and implements the functions according to the embodiments.

Furthermore, the present invention further covers a case where, after the program codes read from the storage medium are written in a function extension card inserted into the computer or in a memory provided in a function extension unit connected to the computer, a CPU or the like contained in the function extension card or function extension unit performs a part of or the entire process in accordance with the designation of program codes and implements the function of the above embodiments.

The present invention is not limited to the above embodiments and various changes and modifications can be made within the spirit and scope of the present invention. Therefore, to apprise the public of the scope of the present invention, the following claims are made.

What is claimed is:

1. An image sensing device capable of installing additional computer software, which controls processing relating to sensing of the image of a subject, from an external device, comprising:

attribute acquisition means for acquiring an attribute of the additional computer software;

discriminating means for determining, based upon the attribute, whether the additional computer software is capable of being used;

inhibiting means for causing said external device to inhibit installation of the additional computer software in said image sensing device in a case where the additional computer software is incapable of being used; and memory means for storing at least one auxiliary program for controlling the operation of said image sensing device, said attribute including auxiliary program information specifying an auxiliary program required by the additional computer software, said discriminating means further determining that the additional computer software is incapable of being used by the image sensing device in a case where the auxiliary program specified by the auxiliary program information is not one of the at least one auxiliary program stored in said memory means.

2. The device according to claim 1, wherein said attribute includes version information, and said discriminating means determines whether the additional computer software is capable of being used based upon the version information.

3. The device according to claim 1, wherein said attribute further includes parameter information which controls image sensing, and said discriminating means determines whether the additional computer software is capable of being used based upon the parameter information.

4. The device according to claim 1, further comprising alerting means which, if installation of the additional computer software has been inhibited by said inhibiting means, issues an alert indicative of this fact.

5. The device according to claim 1, wherein said attribute acquisition means acquires the attribute from said external device.

6. An image sensing device capable of installing additional computer software, which controls processing relating to sensing of the image of a subject, from an external device, comprising:

attribute acquisition means for acquiring an attribute of the installed additional computer software;

discriminating means for determining, based upon the attribute, whether the installed additional computer software is capable of being used;

inhibiting means for inhibiting use of the additional computer software in a case where the installed additional computer software is incapable of being used; and memory means for storing at least one auxiliary program for controlling the operation of said image sensing device, said attribute including auxiliary program information specifying an auxiliary program required by the additional computer software, said discriminating means further determining that the additional computer software is incapable of being used by the image sensing device in a case where the auxiliary program specified by the auxiliary program information is not one of the at least one auxiliary program stored in said memory means.

7. The device according to claim 6, wherein said attribute includes version information, and said discriminating means determines whether the installed additional computer software is capable of being used based upon the version information.

8. The device according to claim 6, wherein said attribute further includes parameter information which controls image sensing, and said discriminating means determines whether the installed additional computer software is capable of being used based upon the parameter information.

9. The device according to claim 6, further comprising alerting means which, if use of the additional computer software has been inhibited by said inhibiting means, issues an alert indicative of this fact.

10. An image processing apparatus having an installing means for installing additional computer software, which controls processing relating to sensing of the image of a subject, in an image sensing device, comprising:

device-information acquisition means for acquiring device information relating to a function of the image sensing device;

discriminating means for determining, based upon the device information, whether the additional computer software is capable of being used by the image sensing device; and inhibiting means for inhibiting installation of the additional computer software in the image sensing device by said installing means in a case where the additional computer software is incapable of being used by the image sensing device, wherein said device information further includes auxiliary program information specifying an auxiliary program possessed by the image sensing device, said discriminating means further verifying whether the image sensing device possesses an auxiliary program required by the additional computer software and determining that the additional computer software is incapable of being used by the image sensing device if the image sensing device does not possess the auxiliary program required by the additional computer software.

11. The apparatus according to claim 10, wherein said device information includes version information indicating the version of the image sensing device, and said discriminating means determines whether the additional computer software is capable of being used by the image sensing device based upon the version information.

12. The apparatus according to claim 10, wherein said device information further includes parameter information which controls image sensing, and said discriminating means determines whether the additional computer software is capable of being used by the image sensing device based upon the parameter information.

13. The apparatus according to claim 10, further comprising alerting means which, if installation in the image sensing device has been inhibited by said inhibiting means, issues an alert indicative of this fact.

14. The apparatus according to claim 10, wherein said device-information acquisition means acquires the device information from said image sensing device.

15. An installation system for installing additional computer software, which controls processing relating to sensing of the image of a subject, in an image sensing device from an external device, comprising:
    attribute acquisition means for acquiring an attribute of the additional computer software;
    discriminating means for determining, based upon the attribute, whether the additional computer software is capable of being used by the image sensing device;
    enabling means for enabling installation of the additional computer software in a case where the additional computer software is capable of being used by the image sensing device;
    installation means for installing the additional computer software in the image sensing device from the external device in a case where installation has been enabled by said enabling means; and
    memory means for storing at least one auxiliary program for controlling the operation of said image sensing device,
        said attribute including auxiliary program information specifying an auxiliary program required by the additional computer software,
        said discriminating means further determining that the additional computer software is incapable of being used by the image sensing device in a case where the auxiliary program specified by the auxiliary program information is not one of the at least one auxiliary program stored in said memory means.

16. The system according to claim 15, wherein said attribute information includes version information, and said discriminating means determines whether the additional computer software is capable of being used by the image sensing device based upon the version information.

17. The system according to claim 15, wherein said attribute includes parameter information which controls image sensing, and said discriminating means determines whether the additional computer software is capable of being used by the image sensing device based upon the parameter information.

18. The system according to claim 15, further comprising alerting means which, if installation of the additional computer software is disabled by said enabling means, issues an alert indicative of this fact.

19. An installation apparatus for installing an additional computer software, which controls processing relating to sensing of the image of a subject, in an image sensing device, comprising:
    acquisition means for acquiring identification information of the image sensing device;
    discriminating means for determining whether identification information that has been attached to the additional computer software agrees with the identification information of the image sensing device;
    inhibiting means for inhibiting installation of the additional computer software in the image sensing device in a case where the identification information that has been attached to the additional computer software and the identification information of the image sensing device fail to agree; and
    attaching means for attaching to the additional computer software identification information for enabling said image sensing device to use the additional computer software.

20. The apparatus according to claim 19, further comprising alerting means which, if installation of the additional computer software has been inhibited by said inhibiting means, issues an alert indicative of this fact.

21. An installation system for installing an additional computer software, which controls processing relating to sensing of the image of a subject, in an image sensing device from an external device, comprising:
    acquisition means for acquiring identification information of the image sensing device;
    discriminating means for determining whether identification information that has been attached to the additional computer software agrees with the identification information of the image sensing device;
    inhibiting means for inhibiting installation of the additional computer software in the image sensing device in a case where the identification information that has been attached to the additional computer software and the identification information of the image sensing device fail to agree; and
    attaching means for attaching to the additional computer software identification information for enabling use of said image sensing device to use the additional computer software.

22. The system according to claim 21, further comprising verification means for verifying whether identification information has been attached to the additional computer software,
    wherein, said attaching means attaches to the additional computer software identification information identical with the identification information of the image sensing device, if identification information has not been attached to the additional computer software.

23. The system according to claim 21, further comprising alerting means which, if installation of the additional computer software has been inhibited by said inhibiting means, issues an alert indicative of this fact.

24. A method for handling a software in an image sensing device capable of installing additional computer software, which controls processing relating to sensing of the image of a subject, from an external device, comprising:
    acquiring an attribute of the additional computer software;

discriminating, based upon the attribute, whether the additional computer software is capable of being used;

inhibiting said external device from installation of the additional computer software in said image sensing device in a case where the additional computer software is incapable of being used; and storing at least one auxiliary program for controlling the operation of said image sensing device, said attribute including auxiliary program information specifying an auxiliary program required by the additional computer software, said discriminating further determining that the additional computer software is incapable of being used by the image sensing device in a case where the auxiliary program specified by the auxiliary program information is not one of the at least one auxiliary program stored in said storing.

25. The method according to claim 24, wherein said attribute further includes version information, and said discriminating determines whether the additional computer software is capable of being used based upon the version information.

26. The method according to claim 24, wherein said attribute further includes parameter information which controls image sensing, and said discriminating determines whether the additional computer software is capable of being used based upon the parameter information.

27. The method according to claim 24, further comprising alerting which, if installation of the additional computer software has been inhibited by said inhibiting, issues an alert indicative of this fact.

28. The method according to claim 24, wherein said acquiring acquires the attribute from said external device.

29. A method for handling a software in an image sensing device capable of installing additional computer software, which controls processing relating to sensing of the image of a subject, from an external device, comprising:

acquiring an attribute of the installed additional computer software;

discriminating, based upon the attribute, whether the installed additional computer software is capable of being used;

inhibiting use of the additional computer software in a case where the installed additional computer software is incapable of being used; and storing at least one auxiliary program for controlling the operation of said image sensing device, said attribute including auxiliary program information specifying an auxiliary program required by the additional computer software, said discriminating further determining that the additional computer software is incapable of being used by the image sensing device in a case where the auxiliary program specified by the auxiliary program information is not one of the at least one auxiliary program stored in said storing.

30. The method according to claim 29, wherein said attribute includes version information, and said discriminating determines whether the installed additional computer software is capable of being used based upon the version information.

31. The method according to claim 29, wherein said attribute further includes parameter information which controls image sensing, and said discriminating determines whether the installed additional computer software is capable of being used based upon the parameter information.

32. The method according to claim 30, further comprising alerting which, if use of the additional computer software has been inhibited by said inhibiting, issues an alert indicative of this fact.

33. A method for handling a computer software in an image processing apparatus having an installing means for installing additional computer software, which controls processing relating to sensing of the image of a subject, in an image sensing device, comprising:

acquiring device information relating to a function of the image sensing device;

discriminating, based upon the device information, whether the additional computer software is capable of being used by the image sensing device; and inhibiting installation of the additional computer software in the image sensing device by said installing means in a case where the additional computer software is incapable of being used by the image sensing device, wherein said device information further includes auxiliary program information specifying an auxiliary program possessed by the image sensing device, said discriminating further verifying whether the image sensing device possesses an auxiliary program required by the additional computer software and determining that the additional computer software is incapable of being used by the image sensing device if the image sensing device does not possess the auxiliary program required by the additional computer software.

34. The method according to claim 33, wherein said device information includes version information indicating the version of the image sensing device, and said discriminating determines whether the additional computer software is capable of being used by the image sensing device based upon the version information.

35. The method according to claim 33, wherein said device information further includes parameter information which controls image sensing, and said discriminating determines whether the additional computer software is capable of being used by the image sensing device based upon the parameter information.

36. The method according to claim 33, further comprising alerting which, if use of the additional computer software has been inhibited by said inhibiting, issues an alert indicative of this fact.

37. The method according to claim 33, wherein said acquiring acquires the attribute from said image sensing device.

38. A method for handling a computer software in an installation system for installing additional computer software, which controls processing relating to sensing of the image of a subject, in an image sensing device from an external device, comprising:

acquiring an attribute of the additional computer software;

discriminating, based upon the attribute, whether the additional computer software is capable of being used by the image sensing device;

enabling installation of the additional computer software in a case where the additional computer software is capable of being used by the image sensing device;

installing the additional computer software in the image sensing device from the external device in a case where installation has been enabled by said enabling; and storing at least one auxiliary program for controlling the operation of said image sensing device, said attribute including auxiliary program information specifying an auxiliary program required by the additional computer software, said discriminating further determining that the additional computer software is incapable of being used by the image sensing device in a case where the auxiliary program specified by the auxiliary program information is not one of the at least one auxiliary program stored in said storing.

39. The method according to claim 38, wherein said attribute information includes version information, and said discriminating determines whether the additional computer software is capable of being used by the image sensing device based upon the version information.

40. The method according to claim 38, wherein said attribute includes parameter information which controls image sensing, and said discriminating determines whether the additional computer software is capable of being used by the image sensing device based upon the parameter information.

41. The method according to claim 38, further comprising alerting which, if installation of the additional computer software is disabled by said enabling, issues an alert indicative of this fact.

42. A method for handling a computer software in an installation apparatus for installing an additional computer software, which controls processing relating to sensing of the image of a subject, in an image sensing device, comprising:
  acquiring identification information of the image sensing device;
  discriminating whether identification information that has been attached to the additional computer software agrees with the identification information of the image sensing device;
  inhibiting installation of the additional computer software in the image sensing device in a case where the identification information that has been attached to the additional computer software and the identification information of the image sensing device fail to agree; and
  attaching to the additional computer software identification information for enabling said image sensing device to use the additional computer software.

43. The method according to claim 42, further comprising alerting which, if installation of the additional computer software has been inhibited by said inhibiting, issues an alert indicative of this fact.

44. A method for handling a computer software in an installation system for installing an additional computer software, which controls processing relating to sensing of the image of a subject, in an image sensing device from an external device, comprising:
  acquiring identification information of the image sensing device;
  discriminating whether identification information that has been attached to the additional computer software agrees with the identification information of the image sensing device;
  inhibiting installation of the additional computer software in the image sensing device in a case where the identification information that has been attached to the additional computer software and the identification information of the image sensing device fail to agree; and
  attaching to the additional computer software identification information for enabling use of said image sensing device to use the additional computer software.

45. The method according to claim 44, further comprising verifying whether identification information has been attached to the additional computer software, wherein, said attaching attaches to the additional computer software identification information identical with the identification information of the image sensing device, if identification information has not been attached to the additional computer software.

46. The method according to claim 44, further comprising alerting which, if installation of the additional computer software has been inhibited by said inhibiting, issues an alert indicative of this fact.

47. A computer readable medium containing program code for implementing the method of claim 24.

48. A computer readable medium containing program code for implementing the method of claim 29.

49. A computer readable medium containing program code for implementing the method of claim 33.

50. A computer readable medium containing program code for implementing the method of claim 38.

51. A computer readable medium containing program code for implementing the method of claim 42.

52. A computer readable medium containing program code for implementing the method of claim 44.

53. A system programmed according the method of claim 24.

54. A system programmed according the method of claim 29.

55. A system programmed according to the method of claim 33.

56. A system programmed according to the method of claim 38.

57. A system programmed according to the method of claim 42.

58. A system programmed according to the method of claim 44.

59. An image sensing device capable of installing additional computer software, which controls processing relating to sensing of the image of a subject, from an external device, comprising:
  a processor that:
    acquires an attribute of the additional computer software;
    determines, based upon the attribute, whether the additional computer software is capable of being used;
    causes said external device to inhibit installation of the additional computer software in said image sensing device in a case where the additional computer software is incapable of being used; and
  memory in which at least one auxiliary program for controlling the operation of said image sensing device is stored,
  said attribute including auxiliary program information specifying an auxiliary program required by the additional computer software,
  said processor that further determines that the additional computer software is incapable of being used by the image sensing device in a case where the auxiliary program specified by the auxiliary program information is not one of the at least one auxiliary program stored in said memory.

60. The device according to claim 59, wherein said attribute includes version information, and said processor determines whether the additional computer software is capable of being used based upon the version information.

61. The device according to claim 59, wherein said attribute further includes parameter information which controls image sensing, and said processor determines whether the additional computer software is capable of being used based upon the parameter information.

62. The device according to claim 59, wherein said processor further issues an alert if installation of the additional computer software has been inhibited.

63. The device according to claim 59, wherein said processor acquires the attribute from said external device.

64. An image sensing device capable of installing additional computer software, which controls processing relating to sensing of the image of a subject, from an external device, comprising:
   a processor that:
      acquires an attribute of the installed additional computer software;
      determines, based upon the attribute, whether the installed additional computer software is capable of being used;
      inhibits use of the additional computer software in a case where the installed additional computer software is incapable of being used; and
   memory in which at least one auxiliary program for controlling the operation of said image sensing device is stored,
   said attribute including auxiliary program information specifying an auxiliary program required by the additional computer software,
   said processor further determines that the additional computer software is incapable of being used by the image sensing device in a case where the auxiliary program specified by the auxiliary program information is not one of the at least one auxiliary program stored in said memory.

65. The device according to claim 64, wherein said attribute includes version information, and said processor determines whether the installed additional computer software is capable of being used based upon the version information.

66. The device according to claim 64, wherein said attribute further includes parameter information which controls image sensing, and said processor determines whether the installed additional computer software is capable of being used based upon the parameter information.

67. The device according to claim 64, wherein said processor further issues an alert if use of the additional computer software has been inhibited.

68. An image processing apparatus having an installation system for installing additional computer software, which controls processing relating to sensing of the image of a subject, in an image sensing device, comprising:
   a processor that:
      acquires device information relating to a function of the image sensing device;
      determines, based upon the device information, whether the additional computer software is capable of being used by the image sensing device; and
      inhibits installation of the additional computer software in the image sensing device by said installation system in a case where the additional computer software is incapable of being used by the image sensing device,
   wherein said device information further includes auxiliary program information specifying an auxiliary program possessed by the image sensing device,
   said processor further verifies whether the image sensing device possesses an auxiliary program required by the additional computer software and determines that the additional computer software is incapable of being used by the image sensing device if the image sensing device does not possess the auxiliary program required by the additional computer software.

69. The apparatus according to claim 68, wherein said device information includes version information indicating the version of the image sensing device, and said processor determines whether the additional computer software is capable of being used by the image sensing device based upon the version information.

70. The apparatus according to claim 68, wherein said device information further includes parameter information which controls image sensing, and said processor determines whether the additional computer software is capable of being used by the image sensing device based upon the parameter information.

71. The apparatus according to claim 68, wherein said processor further issues an alert if installation in the image sensing device has been inhibited.

72. The apparatus according to claim 68, wherein said processor acquires the device information from said image sensing device.

73. An installation system for installing additional computer software, which controls processing relating to sensing of the image of a subject, in an image sensing device from an external device, comprising:
   a processor that:
      acquires an attribute of the additional computer software;
      determines, based upon the attribute, whether the additional computer software is capable of being used by the image sensing device;
      enables installation of the additional computer software in a case where the additional computer software is capable of being used by the image sensing device;
      installs the additional computer software in the image sensing device from the external device in a case where installation has been enabled; and
   memory in which at least one auxiliary program for controlling the operation of said image sensing device is stored,
   said attribute including auxiliary program information specifying an auxiliary program required by the additional computer software,
   said processor further determines that the additional computer software is incapable of being used by the image sensing device in a case where the auxiliary program specified by the auxiliary program information is not one of the at least one auxiliary program stored in said memory.

74. The system according to claim 73, wherein said attribute information includes version information, and said processor determines whether the additional computer software is capable of being used by the image sensing device based upon the version information.

75. The system according to claim 73, wherein said attribute includes parameter information which controls image sensing, and said processor determines whether the additional computer software is capable of being used by the image sensing device based upon the parameter information.

76. The system according to claim 73, wherein said processor further issues an alert if installation of the additional computer software is disabled.

77. An installation apparatus for installing an additional computer software, which controls processing relating to sensing of the image of a subject, in an image sensing device, comprising:

a processor that:
  acquires identification information of the image sensing device;
  determines whether identification information that has been attached to the additional computer software agrees with the identification information of the image sensing device;
  inhibits installation of the additional computer software in the image sensing device in a case where the identification information that has been attached to the additional computer software and the identification information of the image sensing device fail to agree; and
  attaches to the additional computer software identification information for enabling said image sensing device to use the additional computer software.

78. The apparatus according to claim 77, wherein said processor further issues an alert if installation of the additional computer software has been inhibited.

79. An installation system for installing additional computer software, which controls processing relating to sensing of the image of a subject, in an image sensing device from an external device, comprising:

a processor that:
  acquires identification information of the image sensing device;
  determines whether identification information that has been attached to the additional computer software agrees with the identification information of the image sensing device;
  inhibits installation of the additional computer software in the image sensing device in a case where the identification information that has been attached to the additional computer software and the identification information of the image sensing device fail to agree; and
  attaches to the additional computer software identification information for enabling use of said image sensing device to use the additional computer software.

80. The system according to claim 79, the processor further verifies whether identification information has been attached to the additional computer software,
  wherein, said processor attaches identification information identical with the identification information of the image sensing device to the additional computer software if identification information has not previously been attached to the additional computer software.

81. The system according to claim 79, said processor further issues an alert if installation of the additional computer software has been inhibited.

* * * * *